United States Patent Office 3,427,241
Patented Feb. 11, 1969

3,427,241
PHOTOCHEMICAL METHOD OF PREPARING BICYCLO[1.1.0]BUTANE AND CYCLOBUTENE
Rangaswamy Srinivasan, Briarcliff Manor, N.Y., assignor to International Business Machines Corporation, New York, N.Y., a corporation of New York
No Drawing. Filed Nov. 9, 1964, Ser. No. 410,005
U.S. Cl. 204—162
Int. Cl. C07c 3/24, 13/06, 13/34
21 Claims

ABSTRACT OF THE DISCLOSURE

A photochemical method of preparing bicyclo [1.1.0] butanes and cyclobutenes is described. A solution of a linear 1,3 diene or an alkyl substituted linear 1,3 diene is exposed to ultraviolet radiation for a time sufficient to convert about 90% of the 1,3 diene to cyclobutene and bicyclo [1.1.0] butane. The products are separated by distillation and gas chromatography. The products can be utilized as high energy fuels or as starting materials for polymerization reactions.

---

The invention relates to a method of preparing bicyclo [1.1.0] butanes and cyclobutenes, and more particularly to a process for the photochemical synthesis of these compounds from a solution of 1,3-dienes in a solvent.

The synthesis of bicyclo [1.1.0] butane has been attempted in the recent past and as a result of these efforts several methods have been evolved. In one method, alkyldiazomethane in heptane is exposed to ultraviolet radiation. This technique is described in an article by D. M. Lemal, F. Menger and G. W. Clark in the Journal of the American Chemical Society 85, 2529 (1963). In another method described in an article by K. B. Wiberg and G. M. Lampman in Tetrahedron Letters, 30, 2173–2175 (1963) a ring closure of 1-bromo-3-chlorocyclobutane to bicyclo [1.1.0] butane is effected using sodium. Still another method described by R. Srinivasan in the Journal of the American Chemical Society 85, 4045 (1963) is the subject of the present application. This latter method appears to be simple and inexpensive when compared with the technique of Wiberg et al. and provides a relatively high yields of bicyclo [1.1.0] butane when compared with the technique described by Lemal et al. In addition, in the synthesis of bicyclo [1.1.0] butane in accordance with the present method, cyclobutene in amounts seven times as great as the amount of bicyclo [1.1.0] butane is produced.

It is, therefore, an object of this invention to provide a photochemical method of producing bicyclo [1.1.0] butane and cyclobutene which is superior to known methods.

Another object is to provide a method of producing bicyclo [1.1.0] butane and cyclobutene by means of a reaction at ambient pressure and temperature.

Another object is to provide a method of producing bicyclo [1.1.0] butane and cyclobutene which utilizes commercially available starting materials.

Another object is to provide a method of producing bicyclo [1.1.0] butane and cyclobutene which provides relatively high yields of that material.

Another object is to provide a method of producing bicyclo [1.1.0] butane and cyclobutene simultaneously.

Another object is to provide a method of producing bicyclo [1.1.0] butane and cyclobutene in which the unreacted products can be recovered and reused.

A feature of this invention is the method of producing a bicyclo [1.1.0] butane and a cyclobutene which utilizes the step of irradiating a 1,3 diene selected from the group consisting of linear 1,3 dienes and alkyl substituted linear 1,3 dienes with ultraviolet light to convert the 1,3-diene into cyclobutene and bicyclo [1.1.0] butane.

A feature of this invention is a method of producing a bicyclo [1.1.0] butane and a cyclobutene which utilizes the step of irradiating a dilute solution of an alkyl substituted linear 1,3 diene with ultraviolet light to convert the alkyl substituted linear 1,3 diene into an alkyl substituted cyclobutene and an alkyl substituted bicyclo [1.1.0] butane.

Another feature is the method of producing bicyclo [1.1.0] butane and cyclobutene which utilizes the step of irradiating a dilute solution of 1,3-butadiene with ultraviolet light to convert the 1,3-butadiene into cyclobutene and bicyclo [1.1.0] butane.

Another feature of this invention is the method of producing bicyclo [1.1.0] butane and cyclobutene which utilizes the steps of irradiating a dilute solution of 1,3-butadiene in ether with ultraviolet light having a wavelength of 2537 A. for 70 hours to produce a solution of bicyclo [1.1.0] butane, cyclobutene, and solvent, separating the bicyclo [1.1.0] butane and cyclobutene from said solvent by fractional distillation and separating the isomers from each other by gas chromatography.

Another feature in the method of synthesizing a bicyclo [1.1.0] butane and a cyclobutene from a 1,3 diene selected from the group consisting of linear 1,3 dienes and alkyl substituted linear 1,3 dienes is the step of photoisomerizing said 1,3 diene.

The foregoing and other objects and advantages of the invention will be apparent from the following more particular description of the invention as illustrated in the examples.

In accordance with this invention a 1,3 diene is irradiated with ultraviolet to isomerize the diene and synthesize bicyclo [1.1.0] butane and cyclobutene simultaneously. After irradiation for a suitable length of time, the resulting mixture is fractionally distilled and after distillation the pure bicyclo [1.1.0] butane and the cyclobutene are obtainable by conventional gas chromatograph techniques.

The 1,3 dienes consisting of both linear 1,3 dienes and alkyl substituted linear 1,3 dienes may be utilized in the practice of this invention. The linear 1,3 dienes such as 1,3 butadiene and 1,3 pentadiene and an alkyl substituted linear 1,3 diene such as 2 methyl 1,3 butadiene or 2,3 dimethyl 1,3 butadiene is placed in a solvent such as a saturated hydrocarbon, a saturated ether or an alcohol to form a dilute solution by weight of a linear 1,3 diene in solvent. A dilute solution which is 1% by weight of linear 1,3 diene in solvent is preferably utilized to produce the highest yields of bicyclo [1.1.0] butane and cyclobutene but, it should be appreciated that higher concentrations can be utilized if one is willing to settle for lower yields. Saturated hydrocarbons such as isooctane and cyclohexane, alcohols such as ethanol and saturated ethers such as diethyl ether may be utilized as solvents. Irradiation is accomplished utilizing any well known actinic light source which provides radiation in the wavelength range below 3200 A. A low pressure mercury light source, however, is preferable in practicing the present invention. Mercury lamps such as commercially available germicidal lamps provide an easily obtainable and inexpensive light source. High pressure mercury arc lamps in the 1000 watt range may also be utilized.

Irradiation is preferably undertaken at a wavelength of 2537 A. utilizing a bank of sixteen low pressure mercury lamps arrayed in circular fashion about a reaction cell in which the the photolysis is carried out. In this manner, the reaction cell is subjected to high intensity radiation and intensities of the order of $10^{15}$–$10^{17}$ quanta/sec. are absorbed at the cell. It should be appreciated that other light sources and lamp arrays can be utilized without departing from the spirit of this invention.

After irradiation for approximately 70 hours, a maximum amount of bicyclo [1.1.0] butane and cyclobutene has been produced, and the reaction products are separated from the solvent by fractional distillation. Experiments have shown that if the reaction is permitted to go to completion the yield is reduced. It is significant to note, that even though the reaction is not taken to completion there is no waste in this method since the unreacted diene can be recovered and reused. Of the diene present, more than 90% is converted to cyclobutene and bicyclo [1.1.0] butane which appear in the ratio of 7 to 1. Once the reaction products are separated from the solvent, distillation and conventional gas chromatography techniques may be utilized to obtain pure bicyclo [1.1.0] butane and cyclobutene. One significant feature of this process is that it can be carried out at ambient temperature and pressure. Another significant feature of this process which makes its use particularly attractive is the fact that the linear 1,3 diene is the only reactant and dienes such as butadiene are commercially available in high purity form.

Example 1

A 1% solution by weight of 1,3 butadiene in ether is obtained by introducing 10 g. of 1,3 butadiene into 1000 g. of ether. The reaction cell is placed in the center of a circularly disposed array of mercury lamps and irradiated for 70 hours. The reaction products are separated from the ether solvent by fractional distillation and pure bicyclo [1.1.0] butane and cyclobutene are obtained by conventional gas chromatograph techniques. Yield of bicyclo [1.1.0] butane 12%; cyclobutene 80%.

The bicyclo [1.1.0] butane obtained has the following physical characteristics: boiling point at 750 mm. Hg– 8.5° C.; infrared spectrum $3.29\mu$, $3.41\mu$, $8.75\mu$, $9.0\mu$, $10.2\mu$; nuclear magnetic resonace spectrum—$8.61\tau$, $9.55\tau$; mass spectrum—parent peak at 54.

Example 2

The process of Example 1 except that the 1,3 butadiene is replaced by 1,3 pentadiene.

Example 3

The process of Example 1 except that the 1,3 butadiene is replaced by 2 methyl 1,3 butadiene in an ether solvent.

Example 4

The process of Example 1, except that the ether solvent is replaced by an alcohol (ethanol).

Example 5

The process of Example 1, except that the ether solvent is replaced by a saturated hydrocarbon (isooctane or cyclohexane).

The products resulting from the method of this invention have utility as high energy fuels and may also be utilized as starting materials for polymerization reactions.

While the invention has been particularly described with reference to specific examples thereof, it will be understood by those skilled in the art that various changes in procedures may be made therein without departing from the spirit and scope of the invention.

What is claimed is:

1. A method of preparing bicyclo [1.1.0] butane and cyclobutene comprising the steps of irradiating a solution of 1,3 diene selected from the group consisting of linear 1,3 dienes and alkyl substituted linear 1,3 dienes with ultraviolet light having a wavelength less than 3200 A. to convert said 1,3 diene into bicyclo [1.1.0] butane and cyclobutene.

2. A method of preparing bicyclo [1.1.0] butane and cyclobutene comprising the steps of irradiating a solution of linear 1,3 diene with ultraviolet radiation having a wavelength less than 3200 A. to convert said linear 1,3 diene into bicyclo [1.1.0] butane and cyclobutene.

3. A method of preparing bicyclo [1.1.0] butane and cyclobutene according to claim 2 wherein said linear 1,3 diene includes 1,3 butadiene.

4. A method of preparing bicyclo [1.1.0] butane and cyclobutene according to claim 2 wherein said linear 1,3 diene includes 1,3 pentadiene.

5. A method of preparing bicyclo [1.1.0] butane and cyclobutene comprising the steps of irradiating a solution of an alkyl substituted linear 1,3 diene with ultraviolet radiation having a wavelength less than 3200 A. to convert said alkyl substituted linear 1,3 diene into bicyclo [1.1.0] butane and cyclobutene.

6. A method of preparing bicyclo [1.1.0] butane and cyclobutene according to claim 5 wherein said alkyl substituted linear 1,3 diene includes 2 methyl 1,3 butadiene.

7. A method of preparing bicyclo[1.1.0]butane and cyclobutene comprising the steps of irradiating a solution of a 1,3 diene selected from the group consisting of linear 1,3 dienes and alkyl substituted linear 1,3 dienes in a solvent selected from the group comprising saturated hydrocarbons, saturated ethers and alcohols with ultraviolet light having a wavelength less than 3200 A. to convert said 1,3 diene into bicyclo[1.1.0]butane and cyclobutene.

8. A method according to claim 7 wherein the saturated hydrocarbons includes isooctane and cyclohexane.

9. A method according to claim 7 wherein the saturated ethers include ether.

10. A method according to claim 7 wherein the alcohols include ethanol.

11. A method of preparing a bicyclo[1.1.0]butane and cyclobutene comprising the steps of irradiating a solution of a linear 1,3 diene in a solvent selected from the group consisting of saturated hydrocarbons, saturated ethers and alcohols with ultraviolet light having a wavelength less than 3200 A. to convert said linear 1,3 diene into bicyclo- [1.1.0]butane and cyclobutene.

12. A method according to claim 11 wherein said linear 1,3 diene includes 1,3 butadiene.

13. A method according to claim 11 wherein said linear 1,3 diene includes 1,3 pentadiene.

14. A method of preparing bicyclo[1.1.0]butane and cyclobutene comprising the steps of irradiating a solution of an alkyl substituted linear 1,3 diene in a solvent selected from the group consisting of saturated hydrocarbons, saturated ethers and alcohols with ultraviolet light having a wavelength less than 3200 A. to convert said alkyl substituted linear 1,3 diene into bicyclo[1.1.0]butane and cyclobutene.

15. A method according to claim 14 wherein said alkyl substituted linear 1,3 diene includes 2 methyl 1,3 butadiene.

16. A method of preparing bicyclo[1.1.0]butane and cyclobutene comprising the steps of irradiating a dilute solution of 1,3 diene selected from the group consisting of linear 1,3 dienes and alkyl substituted linear 1,3 dienes in ether with ultraviolet light having a wavelength less than 3200 A. and fractionally distilling the irradiated solution to obtain a mixture of bicyclo[1.1.0]butane and cyclobutene and separating said mixture by gas chromatography to obtain pure bicyclo[1.1.0]butane and cyclobutene.

17. A method according to claim 16 wherein the step of irradiating ultraviolet light occurs at a wavelength of 2537 A.

18. A method of preparing bicyclobutane and cyclobutene from a solution of a 1,3 diene selected from the group consisting of linear 1,3 dienes and alkyl substituted linear 1,3 diene by the step of irradiating said 1,3 diene with ultraviolet radiation having a wavelength less than 3200 A.

19. A method of preparing bicyclo[1.1.0]butane and cyclobutene comprising the steps of irradiating a 1% to 10% solution by weight of 1,3 butadiene in ether with ultraviolet light having a wavelength less than 3200 A.

for 70 hours and fractionally distilling the irradiated solution to obtain a mixture of bicyclo[1.1.0]butane and cyclobutene.

20. A method according to claim 19 further includes the step of separating the bicyclo [1.1.0]butane and cyclobutene by gas chromatography to obtain pure bicyclo[1.1.0]butane and cyclobutene.

21. A method according to claim 19 wherein the step of irradiating ultraviolet light occurs at 2537 A.

References Cited

UNITED STATES PATENTS 3,120,479  2/1964  Dols et al. _____ 204—157.1

HOWARD S. WILLIAMS, *Primary Examiner.*